(12) United States Patent
Kim et al.

(10) Patent No.: US 11,176,218 B2
(45) Date of Patent: Nov. 16, 2021

(54) PRESENTING A CUSTOMIZED LANDING PAGE AS A PREVIEW AT A SEARCH ENGINE

(71) Applicant: eBay Korea Co., Ltd., Seoul (KR)

(72) Inventors: Kyung Hoon Kim, Seoul (KR); Un Jee Park, Gyeonggi-do (KR)

(73) Assignee: EBAY INC., San Jose, CA (US)

( * ) Notice: Subject to any disclaimer, the term of this patent is extended or adjusted under 35 U.S.C. 154(b) by 118 days.

(21) Appl. No.: 16/526,766

(22) Filed: Jul. 30, 2019

(65) Prior Publication Data

US 2021/0034690 A1 Feb. 4, 2021

(51) Int. Cl.
*G06F 16/9538* (2019.01)
*G06F 16/906* (2019.01)

(52) U.S. Cl.
CPC ........ *G06F 16/9538* (2019.01); *G06F 16/906* (2019.01)

(58) Field of Classification Search
CPC .......................... G06F 16/9535; G06F 16/9538
See application file for complete search history.

(56) References Cited

U.S. PATENT DOCUMENTS

| 7,801,885 | B1* | 9/2010 | Verma | G06F 16/9535 |
| | | | | 707/713 |
| 8,571,932 | B2 | 10/2013 | Sharma | |
| 8,832,100 | B2 | 9/2014 | Ramer et al. | |
| 8,904,345 | B2 | 12/2014 | Dalal et al. | |
| 9,645,722 | B1* | 5/2017 | Stasior | G06F 16/951 |
| 9,734,518 | B2 | 8/2017 | Suleman et al. | |
| 9,754,036 | B1* | 9/2017 | Gabrilovich | G06F 16/9535 |
| 2005/0240580 | A1 | 10/2005 | Zamir et al. | |
| 2006/0235886 | A1* | 10/2006 | Norman | G06F 16/9535 |

(Continued)

FOREIGN PATENT DOCUMENTS

| KR | 101171405 B1 | 8/2012 | |
| WO | WO-2016150959 A1 * | 9/2016 | G06Q 30/0277 |

OTHER PUBLICATIONS

Stack Overflow, How to force link from iframe to be opened in the parent window, accessed https://stackoverflow.com/questions/1037839/how-to-force-link-from-iframe-to-be-opened-in-the-parent-window (Year: 2009).*

*Primary Examiner* — William Spieler
(74) *Attorney, Agent, or Firm* — Shook, Hardy & Bacon L.L.P.

(57) ABSTRACT

Methods, systems, and computer storage media are provided for presenting a preview of a customized landing page at a search engine are provided. The search engine may provide search results that comprise a preview of the customized landing page, where a user may interact with the customized landing page while at the search engine. The user may select a landing-page link provided by the customized landing page using the preview at the search engine. Based on selecting the landing-page link, the user is navigated directly from the search engine to a webpage associated with the landing-page link. A customized landing page may be generated for display at the preview of the search engine, where the customized landing page includes a user-specific element, such as information specific to the user, which may be based on a user identifier communicated from the search engine to a customizable landing-page website.

20 Claims, 6 Drawing Sheets

(56) References Cited

U.S. PATENT DOCUMENTS

| | | | |
|---|---|---|---|
| 2008/0086451 A1* | 4/2008 | Torres | G06F 16/951 |
| 2009/0037355 A1* | 2/2009 | Brave | G06F 16/9535 |
| | | | 706/45 |
| 2009/0049039 A1* | 2/2009 | Ryland | G06F 16/951 |
| 2011/0082850 A1* | 4/2011 | Ball | G06F 16/9535 |
| | | | 707/706 |
| 2016/0180389 A1* | 6/2016 | Kotas | G06F 16/958 |
| | | | 705/14.54 |
| 2017/0185694 A1* | 6/2017 | Stasior | G06F 3/0482 |

* cited by examiner

PRESENTING A CUSTOMIZED LANDING PAGE AS A PREVIEW AT A SEARCH ENGINE

BACKGROUND

Conventional search engines receive search queries and provide search results to a user. A user can submit a search query to receive search results. The search results from a search engine, such as NAVER or BING, can be presented such that the search results links ("link") of search results link to (or provide navigation to) another website. When the user selects a link within the search results, at a search engine, the user is conventionally directed to a webpage (e.g., landing page) that corresponds to the link. A second user can have search results having links that link to the same landing page, such that when the second user selects the link, the second user is directed to the same landing page as the first user. The webpage that the users are linked to is generic and does not change from user to user. The users also have no way to know, when at the search engine, what a webpage will provide when the users navigates to the site if the webpage includes information specific to each user. In search interfaces of conventional search engines, each user is then required to independently interact with the webpage, without any additional information, to accomplish a task or view specific material important to the user.

SUMMARY

At a high level, aspects described herein relate to providing a preview of a customized landing-page website to a user while the user is at the search engine. The technology described herein allows the user to preview the customized landing page at the search engine (e.g., a search interface (web page) of the search engine), so that the user does not have to navigate to the landing page to view the customized elements.

To do so, a search engine may receive a search query. When providing responses to the search query, the search engine may provide a preview of the landing-page website (the site the user may navigate to upon selecting a link associated with the search result). The landing page preview may provide the user with an image of a customized landing page that was generated by a customizable landing-page website.

To generate the customized landing page, the customizable landing-page website may receive a search query and a user identifier, identifying the user, from the search engine. The customizable landing-page website may be generated based on a user-specific element and a user-specific data item. The user-specific element generally includes any information presented (or information used for presenting) on the customized landing page that is specific to the user. The user-specific data item may include any information known about the user, such as stored user metadata. The customizable landing-page website may identify a user-specific element to generate the customized landing page. The user-specific element may be determined based on the search query received from the search engine and a user-specific data item determined based on the user identifier. Thus, the customized landing page may be generated to include a user-specific element that is related to the search query and has attributes related to the user-specific data item.

The customized landing page may be communicated from the customizable landing-page website to the search engine, where a preview of the customizable landing page is displayed at the search engine. The user may interact with the customized landing page through the preview, including selecting a landing-page link associated with the user-specific element, which may directly navigate a user to a webpage associated with the landing-page link.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
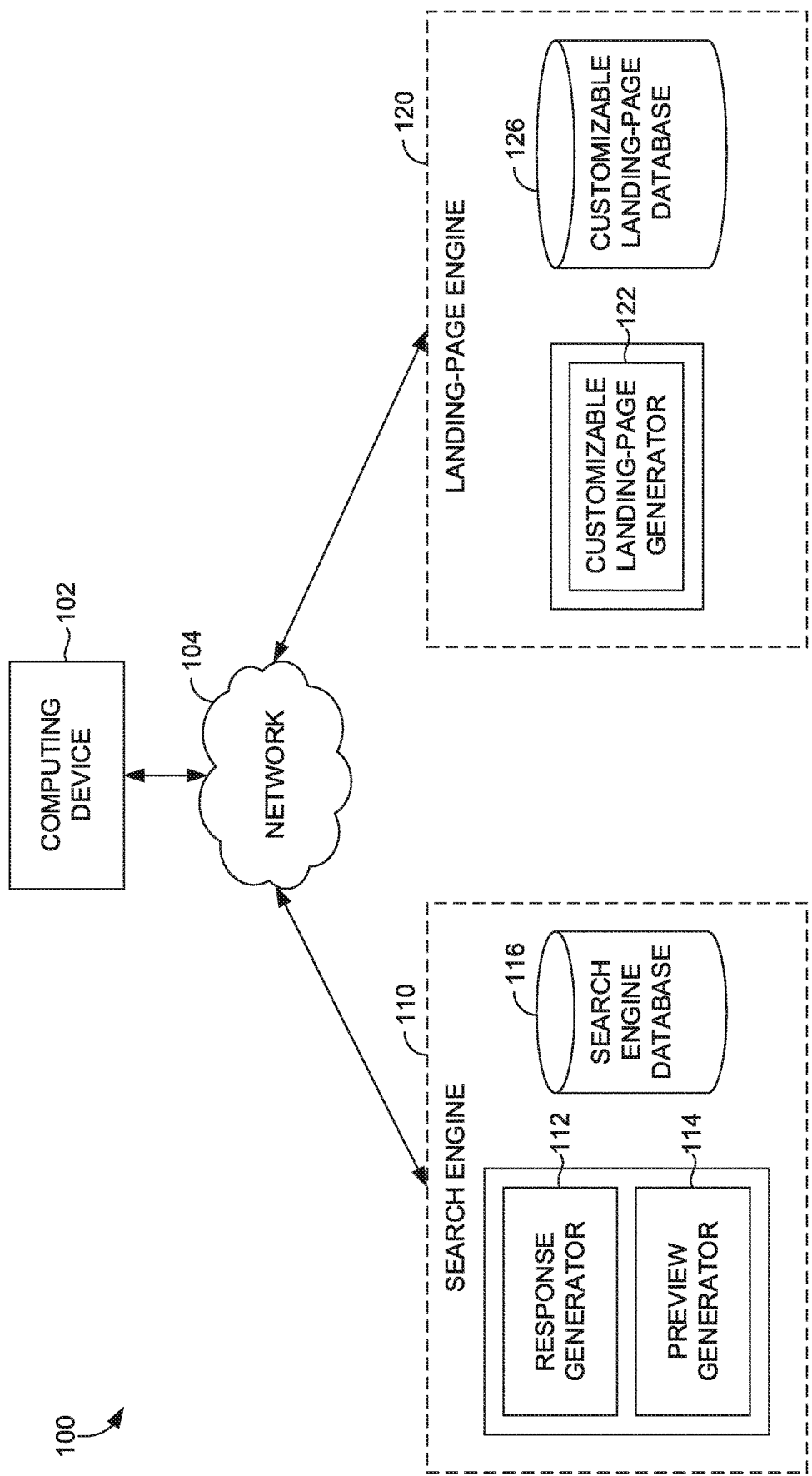
FIG. 1 is an example search system in which implementations of the present disclosure may be employed.

The present technology relates to methods, systems, and computer storage media for providing a preview of a customized landing page at a search engine. That is, when a user provides a search query to a search engine, the search engine may display the preview of the customized landing page as a search result while the user is still on the search engine webpage.

The landing-page website that is presented at the search engine may be specific to the user. Thus, even when different users enter the same search query, a customized landing page that is generated for each user may be different. As such, each user may experience a preview of the customized landing page at the search engine that is different and user dependent.

As an example, a user inputs a search query into a search engine. The search query is received from the search engine by a customizable landing-page website, which may operate to redirect the user from the search engine to the customizable landing-page website. A user identifier may also be received from the search engine. The user identifier identifies the user that is associated with the search query. As examples, the user identifier may be an IP address or a "user name" associated with the user.

The user identifier may be used to identify user-specific data, which may also be referred to as "user attributes," meaning that the user-specific data may be unique to the user or represent the user in some way. This may include metadata in the form of "cookies" received from the user's computer, metadata collected about the user based on the user's previous interactions with the customizable landing-page website or the search engine, and other forms of user metadata collected from various sources.

The user-specific data and the search query may be used by the customizable landing-page website to customize the customized landing page. The customized landing page may include customized elements specific to the user (i.e., a user-specific element based on the search query and the user-specific data). Sometimes, a customized landing page includes a hyperlink that causes navigation to a webpage associated with the hyperlink. The hyperlink may be associated with the user-specific element and cause navigation to a webpage having more information about the user-specific element.

The customized landing page of the customizable landing-page website may be communicated back to the search engine from the customizable landing-page website. At the search engine, a preview of the customized landing page ("preview") may be displayed. Displaying the preview may include displaying the preview in a preview pane at the search engine.

On the display of the preview, a user may select a hyperlink (or "link") associated with the user-specific element. Upon selecting the link, the user is navigated from the search engine to the webpage associated with the selection and the link. Said differently, the user is able to view and select the link included on the customized landing page at the preview provided by the search engine, and can be navigated directly to the webpage associated with the link without having to first navigate to the customized landing page.

To provide a working example, a user enters a search query into a search engine, such as "Shoes." The search query, along with a user identifier, is communicated to and received at a customizable landing-page website, where the customizable landing-page website offers a variety of shoes for sale to the user. Based on user-specific data, different attributes of shoes are identified, such as size, color, brand, style, etc. In particular, when the user-specific data associated with the user indicates that the person has recently viewed industrial work gloves and size twelve sneakers, then the attributes identified for shoes can be "boots," "steel-toe," and "size twelve."

Based on the search query and the user-specific data, the customizable landing-page website may generate a customized landing page that includes a user-specific element for steel-toe boots that are size twelve. The user-specific element may be associated with a hyperlink to a webpage having more information about the size twelve, steel-toe boots. In an aspect, the customizable landing-page website may generate a phrase or message to the user that includes the user-specific elements and cause display of the phrase or message on the customized landing page. For example, the customized landing page might include: "Hey Brian, check out these boots we found for you. They are size twelve and have a steel toe for working." In this case, the message includes the user-specific elements, "size twelve," "steel toe," and "boots," but they are presented to the user in a friendly, easy-to-understand manner.

Having generated the customized landing page, the customizable landing-page website may communicate the generated customized landing page to the search engine. The search engine may cause display of all or a portion of the customized landing page as a preview in a preview pane.

At the search engine, the user may view various portions of the customized landing page in the preview pane, including a portion having the user-specific element of size twelve and steel toe boots. By selecting a hyperlink associated with the user-specific element in the preview, the user is then navigated to the webpage for the size twelve, steel-toe boots.

In this way, the user is navigated from the search engine to the webpage associated with a user-specific element. This may include directly navigating the user from the search engine to the webpage for the size twelve, steel-toe boots without navigating to the customized landing page, which may contain any number of other user-specific elements. However, it is contemplated that, in some embodiments of the technical solution, the user may first be navigated to the customized landing page and caused (e.g., user indication or automatically) to be navigated to the web page.

By providing the preview at the search engine, the user is able to view the customized landing page and interact with it, while continuing to remain at the search engine. Using the provided technical solution, a user may be able to view multiple previews of various customized landing pages, and may interact with any of the previews before making a further selection.

The described technology is superior to and improves upon conventional methods for internet navigation. For example, conventionally, a user may enter a search query at a search engine and receive multiple search results having search results links ("link") that link to other websites. Some of the websites corresponding to the links at the search engine may or may not have the information that satisfies the search query of the user. Thus, conventionally, the user would have to iteratively navigate to one website after another to identify this information. If the information is not located at a particular website, the user must return to the search engine and try again with another website. The iterative navigation continues until the user finds information that satisfies the search query and selects the information for further action. By utilizing the technical solutions described here, the user is no longer required to iteratively navigate from site to site, returning to the search engine in between. Rather, the user may identify the desired information at the preview and interact with the information, such as navigating to another webpage using a hyperlink. Further, when different users having different user attributes enter a search query, the resulting previews may provide different information based on customizable landing-page websites generating customized landing pages specific to the user.

Turning now to FIG. 1, FIG. 1 illustrates example search system 100 in which implementations of the present disclosure may be employed. In particular, FIG. 1 illustrates a high level architecture of search system 100 having components in accordance with implementations of the present disclosure. The components and architecture of FIG. 1 are intended as examples, as noted toward the end of Detailed Description.

Among other components or engines not shown, search system 100 includes computing device 102. Computing device 102 is shown communicating using network 104 to search engine 110 and customizable landing-page engine ("landing-page engine") 120. The components of search system 100 may communicate with each other over one or more networks (e.g., public network or virtual private network "VPN") as shown with network 104. Network 104 may include, without limitation, one or more local area networks (LANs) wide area networks (WANs), or any other communication network or method. Computing device 102 may be a client computing device that corresponds to the computing device described herein with reference to FIG. 6.

Search engine 110 is illustrated as including response generator 112 and preview generator 114. Search engine 110 may also include search engine database 116. Search engine database 116 generally stores information including data, computer instructions (e.g., software program instructions, routines, or services), or models used in embodiments of the technical solutions. Although depicted as a database component, search engine database 116 may be embodied as one or more data stores or may be in the cloud.

Search engine 110 may collect and receive user-specific data. User-specific data includes user-specific data items, which may be any piece of information known about a user. For example, search engine 110 may collect user-specific data when a user interacts with search engine 110. This may include previous search queries submitted to search engine 110, previous viewed or selected search results at search engine 110, and the like. User-specific data may be received by search engine 110. For example, search engine 110 may receive user-specific data from the user or computing device 102, such as a user providing preferences or providing user profile information, or by collecting user internet cookies. User-specific data may be collected by search engine 110 from other websites or servers, such as a landing-page website. More generally, search engine 110 may collect or receive user-specific data from any source. User-specific data may be included as part of a user profile, e.g., "user attributes," and stored on search engine database 116.

As used herein, the term "landing-page website" may also include a "customizable landing-page website," as a customizable landing-page website is a landing-page website that may generate, in whole or in part, a customized landing page for a user. Also, as used herein, a "customized landing page" is a webpage generated by the customizable landing-page website in which any portion of the webpage has been modified or created for a particular user. For ease of discussion and brevity, the term "landing-page website" is meant to include "a customizable landing-page website." Similarly, the term "landing page" may also include "customized landing pages."

A landing page may be any webpage linked to a search result provided by search engine 110. Thus, continuing with some of the previous examples, the landing page may include a webpage having a news article, a webpage having a definition, etc. that is related to the search query. Thus, when a hyperlink (or "link") to the landing page is selected at the search engine, the user is navigated to the "landing page."

A landing-page website may be a website associated with a landing page linked to a search result at the search engine. The landing-page website may include other areas or pages, in addition to the landing page, to which the user may navigate, and which may be linked to the landing page or accessed separately from the landing page. In a specific example, a landing-page website is an e-commerce marketplace website indexing goods or services provided by a seller.

A "user" may broadly include any identifiable origin of information. For example, a user may include a person using a computing device, such as computing device 102. A user may include computing device 102, itself. In another example, a user may include the network over which computing device 102 communicates, such as one identified by an Internet Protocol (IP) address. Thus, for example, the user profile may be specific to a particular person, a particular computing device, a specific IP address, or the like, and stored at search engine database 116. In a specific example, a user is a candidate buyer of the goods or services from an e-commerce marketplace website.

A user identifier may be used to identify the user. For example, the user identifier for a person may be a user login name, email address, or the like. A user identifier for a computing device, such as computing device 102, may include any information that specifically identifies the computing device, such as a serial number or unique data element transmitted by the computing device when communicating. A user identifier may include an IP address or other network address that identifies a location where information originates.

Turning back to search engine 110, generally, search engine 110 may provide search results in response to receiving a search query. Examples of Internet search engines include BING and NAVER, or any other search engine that comprises an Internet web crawler for identifying websites having information related to search queries. A user may enter a search query into search engine 110 to receive additional information about the search query. In response to the search query, search engine 110 may provide links to landing-page websites that comprise additional information about the search query. For example, NAVER receives a specific search query. In response, NAVER generates and causes display of search results to a user search results. The search results are related to the specific search query, such as news articles about the search query, a definition of the search query, a wiki page about the search query, an e-commerce website for purchasing items related to the search query, and the like.

To provide the search results, search engine 110 may utilize response generator 112. In general, response generator 112 determines and provides related search results in response to a search query entered at a search engine website associated with search engine 110. Response generator 112 may be configured for crawling the Internet and identifying websites having material related to the search query. In some cases, response generator 112 may utilize a method of query expansion, such as synonymic expansion, to identify related material. Once related webpages are identified, links to the webpages may be provided as search results in response to the search query.

Response generator 112 may identify and receive related search results that have been stored in search engine database 116. For example, search engine 110 receives information about a website, for example by previously crawling the Internet or generally communicating with the website. This website information may be stored in search engine database 116 for later use by search engine 110 and response generator 112.

Search engine 110, using preview generator 114, may provide a preview of a landing-page website at a search engine website associated with search engine 110. Preview generator 114 may provide the preview as a search result to a search query. Preview generator 114 may provide the preview as part of the search result to the search query. The preview may include all of, or a portion of, a landing-page website.

Turning again to search engine 110, preview generator 114 may render a graphical user interface (GUI) that includes one or more search results determined by response generator 112. One example GUI will be discussed with reference to FIG. 2. Continuing with FIG. 1, for a search result, preview generator 114 may render a preview of the landing page associated with the search result. The preview may comprise an image of the landing page, and the image may comprise all of or a portion of the landing page. In aspects, preview generator 114 may generate and provide a preview of a customized landing page, which includes an image of the customized landing page, where the image comprises all of or a portion of the customized landing page.

Preview generator 114 may be configured to generate and provide the preview within a preview pane. The preview pane may include a set of boundaries on the rendered GUI. The preview of the landing page may be displayed within the preview pane. In some aspects, the preview pane is included as, or as part of, a search result and displays the image of the landing page associated with the search result.

Preview generator 114 may be configured to generate a preview that may be manipulated in response to user input. Said differently, the user may interact with the preview to change the preview of the landing page. In some cases, preview generator 114 may generate a preview within a preview pane that may be manipulated in response to user input.

For instance, the preview of the landing page displayed at the search engine may change in response to a user input. That is, the preview may comprise a first portion of the landing page. In response to a user input, the preview may change. For example, the user may zoom in or out, or scroll in any direction, or the like to provide a different view of the landing page. Thus, in response to the user input, the preview may comprise a second portion of the landing page. The second portion may be different than the first portion. For example, the second portion may be entirely different from the first portion, having no common area of the landing page, or the second portion may be partially different than the first portion, having at least some common area of the landing page within the preview.

User input, for example, may be any action provided by a user. For instance, a user input may include a mouse click or movement, pressure applied to a touch-screen interface, movement along a smart pad, or any other interaction with device or sensor for receiving and communicating a user action.

Previews generated and provided by preview generator 114 may be interactive. Interactive refers to how the user can interact with the preview of a landing page at the search engine in a same or similar manner that the user would interact with the landing page when the user is visiting the landing-page website.

For example, at the preview provided at the search engine, the user enters text into the landing page. In this aspect, the preview is text-receivable. When the landing page includes a search bar, a user enters text into the search bar. The landing page is searched using search functionality of the search engine through the search bar while the user remains at the search engine. In another example, at the preview provided at the search engine, the user clicks on a hyperlink embedded in the landing page. By clicking on the hyperlink, the user is navigated to a webpage associated with the hyperlink. In some cases, the user is directly navigated to the webpage associated with the hyperlink without navigating to the landing page comprising the hyperlink. However, it is contemplated that, in some embodiments of the technical solution the user may first be navigated to the customized landing page and caused (e.g., user indication or automatically) to be navigated to the web page.

To generate and provide previews that are interactive, preview generator 114 may access the landing page via a URL of the landing page (the "landing page URL"). Preview generator 114 may provide the accessed landing-page website at any location when rendering the GUI at the search engine. Preview generator 114 may render a GUI having search results determined by response generator 112 and having the preview of the landing page, e.g., the location selected to display the landing page at the search engine.

Preview generator 114 may render the GUI so that all of, or a part of, a search result includes a location displaying the preview of the landing page. Search engine 110 may render a GUI, using preview generator 114 that includes search results for a search query. One or more of the search results includes a preview of the landing page, the preview may be provided by accessing the landing page via the landing page URL. Accessing landing page of the URL causes display of all, of or a portion of, the landing page at the location of the preview. The GUI may be rendered and provided to the user without the user navigating away from the search engine website associated with search engine 110.

To provide a working example of an aspect of search engine 110, search engine 110 receives the user input, "Shoes." Response generator 112 crawls the web or access stored website information to identify search results (e.g., landing-page websites) that relate to "Shoes." Among other examples, the search results include a website for a wiki page about shoes, including more information on various types, how they are made, origins of different types, and so forth. Example results include websites for movies or books related to the search term "Shoes," such as The Shoe Book Series. Example search results also include websites where people engage in the buying and selling of shoes as a good. Preview generator 114 renders a GUI having search results that comprise a preview of their associated landing pages of landing-page websites. Thus, some of the search results include images of the landing page, which can be manipulated to view all of or various portions of the landing page. The user interacts with a landing page through a preview. In an example, the landing page is associated with a website for the buying and selling of goods. The landing page, therefore, also includes various search results for "Shoes" that are hyperlinks to search result webpages associated with the particular good described by the search result (e.g., search results including various types or sellers of shoes). Upon selecting a search result hyperlink, the user is directly navigated away from the search engine to the search result webpage associated with the hyperlink.

To navigate the user from the search engine to a webpage associated with a selected hyperlink (e.g., the selection of a link at a preview of a landing page), an indication may be communicated. The hyperlink provided by a landing page is referred to as a "landing-page link." The indication may include the landing page URL associated with the landing-page link, which may be communicated to a web browser of computing device 102 to access the webpage using the web browser. In some cases, the indication may be communicated to the landing-page website, for example, so that the landing-page website provides a response to the selection, such as providing the webpage associated with the selected landing-page link to the user or the search engine.

The landing page provided at search engine 110 as a preview may be a customized landing page provided by a customizable landing-page website. A customizable landing-page website may comprise landing-page engine 120 communicating with network 104. Generally, landing-page engine 120 generates and provides a customized landing page for a user. Landing-page engine 120 provides the customized landing page to search engine 110 for presentation as a preview. In some aspects, landing-page engine 120 provides or communicates the customized landing page by generating the customized landing page and communicating a landing-page URL associated with the customized landing page to search engine 120.

To generate the customized landing page, customized landing-page engine 120 may utilize customized landing-page generator 122. Customized landing-page generator 122 generates a customized landing page for the user based on user-specific data associated with a user identifier for a user.

A user-specific data item may be any information known about the user, such as that previously discussed. User-specific data may be collected or received by landing-page engine 120. Collected user-specific data may be collected based on the user's previous interactions with the customizable landing-page website associated with landing-page engine 120. Received user-specific data may be received from any source previously discussed with response to the user-specific data received by search engine 110. Landing-page engine 120 may receive user-specific data from search engine 110, as well. Collected and received user-specific data may be stored in customizable landing-page database 126.

Customizable landing-page database 126 generally stores information including data, computer instructions (e.g., software program instructions, routines, or services), or models used in embodiments of the technical solutions. Although depicted as a database component, customizable landing-page database 126 may be embodied as one or more data stores or may be in the cloud.

Landing-page engine 120 may receive a search query from search engine 110. Landing-page engine 120 may also receive a user identifier of a user associated with the search query.

Using the user identifier and a user-specific data item, customized landing-page generator 122 may generate a customized landing page for a user associated with the received search query. Generally, to generate the customized landing page, customized landing-page generator 122 may modify or generate a webpage having information related to the search query with information related to a user-specific data item. The customized information of the customized landing page may be referred to as a user-specific element.

In an example, a customizable landing-page website associated with landing-page engine 120 is identified as related to the search query by search engine 110. Using the user identifier received from search engine 110, customized landing-page generator 122 identifies a user-specific data item for the user, such as past search history, user preferences, past purchase history, etc. Based on the user identifier, customized landing-page generator 122 modifies or generates a customized landing page of the customizable landing-page website with the user-specific element.

For example, customized landing-page generator 122 modifies the customized landing page to include the user-specific element, which may be a particular piece of information based on the user-specific data item, e.g., if the search query is "Shoes" and the user previously searched "Size 12 Boots" (a user-specific data item), then customized landing-page generator 122 modifies the customized landing page to include a link to shoes that are size twelve. In some cases, the user-specific element is included in the context of a sentence, for example, by accessing portions of a sentence and replacing the nouns and adjectives with the user-specific nouns and adjectives, such as "size twelve" and "boots." Other methods for generating a phrase or message that provides context to the user-specific element may be utilized. In doing this, the user is presented with personalized messages having the user-specific elements that have been determined. For example, the customized landing page may be generated to include: "Hey Brian, are you looking for size 12 boots? We have some that would be good for working because they have a steel toe." It will be recognized that this is only one example, and the user-specific elements may be presented in any manner.

In an embodiment, a user-specific element includes a user-specific feature for presentation on the user interface of a generated customized landing page. A user-specific feature might be a change to the look or feel of the customized landing page, in which case, the user may be more likely to interact with the customized landing page or select the landing-page link presented at the search engine. As an example, it is identified from the user-specific data that the user tends to interact more with objects or elements that include the color pink. Thus, the customized landing page is be generated so that it includes pink features, such as the overall dress of the customized landing page including pink or pink tones. Since the user views a portion of the customized landing page at a preview presented at a search engine, the user-specific features that are pink may tend to grab the user's attention at the search engine, such that the user selects a landing-page link to navigate to the customized landing page having the pink features or interact with the customized landing page at the preview in another way.

In another example, the customizable landing-page website is a website primarily used for the buying and selling of goods and services (an e-commerce website). The website has numerous product and service webpages associated with a good or service that include more information about the good or service, and provide a point where a user can purchase, sell, or trade the good or service. To sell the goods and services, the customizable landing-page website provides the goods and services to users in response to a search query in the form of search results. In this example, the e-commerce website provides a customized landing page comprising search results (where the search results comprise user-specific elements). The search results can be linked to the product or service webpages having the additional information about the product or service.

Using this example, if a user enters a search query of "Shoes" at search engine 110, the search query is received from search engine 110 by landing-page engine 120, which is associated with the e-commerce website in this example. Customized landing-page generator 122 generates one or more search results of items for sale on the e-commerce website. The search results generated by customized landing-page generator 122 are specific to the user based on user-specific data. For instance, if the search query is "Shoes," customized landing-page generator 122 may identify and provide (e.g., present) a search result including size twelve shoes based on a user-specific data item indicating the user has previously viewed size twelve boots. In another example, the user has recently purchased a dress and previously viewed size twelve shoes (user-specific data items), and thus, customized landing-page generator 122 identifies and provides search results for "Shoes" that include size twelve shoes matching the dress color and provides size twelve shoes with heels.

The user-specific element (e.g., search results of the customized landing page), generated by customized landing-page generator 122, may be a subcategory of the search query. The subcategory may be determined based on a user-specific data item associated with a user identifier. The subcategory may include information related to the search query, where the information also includes additional attributes determined using the user-specific data item. Put another way, customized landing-page generator 122 may generate a user-specific element for a search query that has additional attributes specific to the user, the additional attributes determined based on one or more user-specific data items.

For example, customized landing-page generator 122 identifies numerous results for shoes (the category of the search query "Shoes"). A user-specific data item includes size twelve boots in recent purchase or browsing history. Thus, a subcategory of the search query "Shoes" includes shoes that are size twelve. Here, a search result including shoes relates to the search query, while a specific search result for size twelve shoes is a subcategory because it includes the additional attribute of size twelve, which in this case, is related to the use-specific data item of size twelve boots.

As discussed, customized landing-page generator 122 may identify and provide a user-specific element (such as search returns of the customized landing page) when generating the customized landing page using a search query and a user-specific data item. The user specific-data item may be determined based on a user identifier. The search query and the user identifier may be received from search engine 110.

One example method that customized landing-page generator 122 can use to identify information, such as search returns, that may be provided in the customized landing page, comprises a clustering analysis for keyword expansion.

One clustering analysis method utilizes an index of user-specific data (the user attributes). The user-specific data is indexed and stored, for example, at customizable landing-page database 126. The clustering analysis, such as k-means clustering, may be performed on the user-specific data. Doing so may identify user-specific data clusters within the index.

When a search query is received at customized landing-page generator 122, customized landing page generator 122 may identify keywords within the search query. A keyword broadly includes any word or group of words. Keywords may be identified using any method known in the art. For example, keywords may be identified by extracting n-grams from the search query; identifying words that are not conjunctions, prepositions, articles, etc.; identifying words of a certain length; identifying words matching a word database; or any other method.

In one example, the keywords of the search query are expanded to include attributes related to the keywords. These attributes may also be related to the search query. In an example, the index of user-specific data is utilized to expand the keywords. By "expanding," it is meant that words may be identified in addition to the keyword, which may be used as attributes of the search query, e.g., may be used to search a database to identify information for use in generating the customized landing page. In one example, to expand the keywords, a k-nearest neighbors algorithm is used to identify user-specific data clusters from among the indexed user-specific data clusters. Other methods for keyword expansion may be utilized.

The keywords of the search query and the expanded keywords determined from keyword expansion may be used as search constraints to identify information. For example, the search constraints may be used to search within the customizable-landing page index. Since the expanded keywords may be user specific because of the user attributes, the result of searching the customizable-landing page index yield information that is specific to the user associated with the search query. This information specific to the user may be provided as part of the customized landing page as the user-specific element.

To continue with an example already used, in the context of e-commerce, the search query received by search engine 110 is expanded by customized landing page generator 122 to identify user-specific attributes. The user-specific attributes are used as search constraints to search an item index associated with the e-commerce website (e.g., the customizable landing-page website) to identify item listings related to the search query that include the user-specific attributes. Since the search query and the user-specific attributes associated with the search query are used as search constraints, the item listings identified in the item listing index are unique to the user. Using the identified item listings, the customized landing page is generated by customized landing-page generator 122.

In some cases, customized information (e.g., a user-specific element) included in the customized landing page may comprise links, such as a hyperlink, that navigate to a webpage associated with the link. A user-specific element may comprise a hyperlink when the user-specific element has an embedded landing page URL. A user-specific element may comprise a hyperlink when the user-specific element is associated with a hyperlink at the customized landing page in some manner. The hyperlink associated with the user-specific element may be referred to as a landing-page link. In the context of the example just described, an item listing comprises a hyperlink to a webpage associated with the item listing that includes additional information about the item and provides a method for a user to purchase the item.

Having generated a customized landing page, landing-page engine 120 may communicate the customized landing page to search engine 110. At the search engine website associated with the search engine 110, a preview of the customized landing page may be provided, such that the user may interact with the customized landing page. This may include the user selecting a hyperlink provided on the customized landing page and navigating directly to the webpage associated with the hyperlink.

While some aspects of the technology have been described with reference to e-commerce, the e-commerce example is but one example to assist in describing and illustrating the technology of providing a preview of a landing page at a search engine, where a user may interact with the preview while remaining at the search engine. It will be appreciated that the underlying technology and technological processes described are be applicable across many different use cases, such as landing-page websites associated with news articles, travel reservations, education, entertainment, and countless other website types. While aspects have been described in more detail in the context of e-commerce, it will also be appreciated that the underlying technology enhances how the Internet is navigated, e.g., how a user goes from website to website in an increasingly crowded space, regardless of the type of websites being navigated to and from. The underlying technological processes allow for more efficient navigation of the Internet by reducing the number of nodes or relay points (e.g., websites) that a user must navigate to in order to arrive at a specific online destination.

Figure 2:
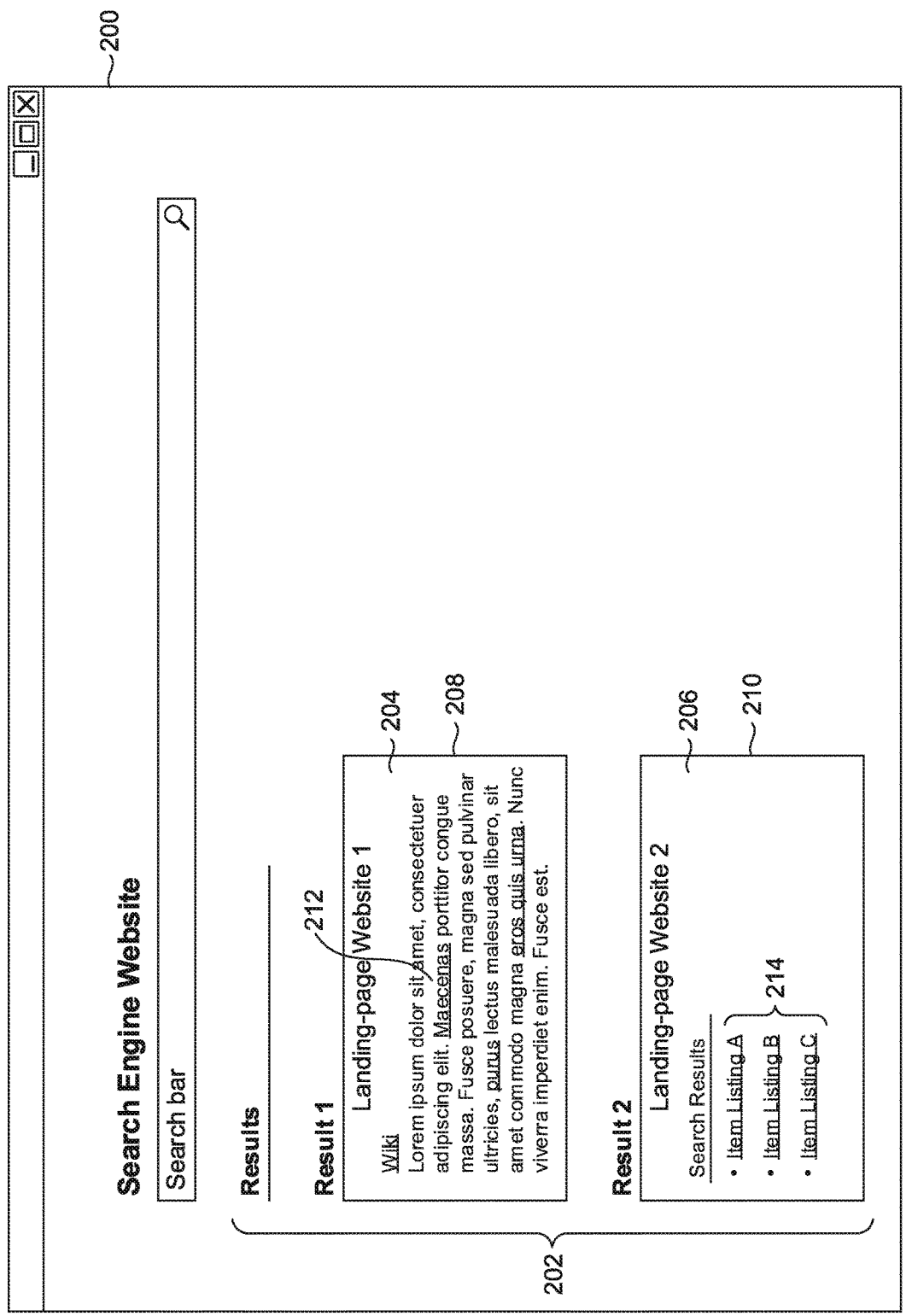
FIG. 2 is an example illustration of a Graphical User Interface (GUI) having search results provided by a search engine website, in accordance with aspects described herein.

With reference now to FIG. 2, FIG. 2 provides an example illustration of GUI 200 having search results provided by a search engine website. For example, GUI 200 may be rendered in response to a search query entered at the search engine website. GUI 200 includes a list of search results 202. The search results are related to the search query. While only two search results are illustrated, it will be understood that any number may be provided based on the search query.

In the example provided by FIG. 2, first search result preview 204 represents a preview of Landing-Page Website 1, which is shown as a wiki page. Landing-Page Website 1 includes additional information regarding the search query. In this particular example, first search result preview 204 is provided in a first preview pane 208. As previously discussed, a user can manipulate or interact with first search result preview 204, such as zoom, scroll, enter text, etc. In some cases, the user can select a hyperlink, such as hyperlink 212, embedded in Landing-Page Website 1 at first search results preview 204. By selecting hyperlink 212, the user is navigated from the search engine website to the webpage associated with the hyperlink.

Continuing with FIG. 2, second search result preview 206 represents a preview of a landing page that is also a customized landing page of a customizable landing-page website. The customized landing page may be generated and provided to search engine website using methods previously discussed. Second search result preview 206 is shown having second preview pane 210. A user may interact with the landing page-website at second search result preview 206.

As discussed, the customized landing page may be generated to include information specific to the user entering the search query at the search engine website. In this example, the customized landing page includes Item Listings A-C 214. Item listings A-C 214 are related to the search query and include attributes specific to the user. Item Listings A-C 214, in this case, are the user-specific elements of the customized landing page. Item listings A-C 214 may also comprise a hyperlink that navigates a user from the search engine website to the webpage associated with the selected item listing.

Figure 3:
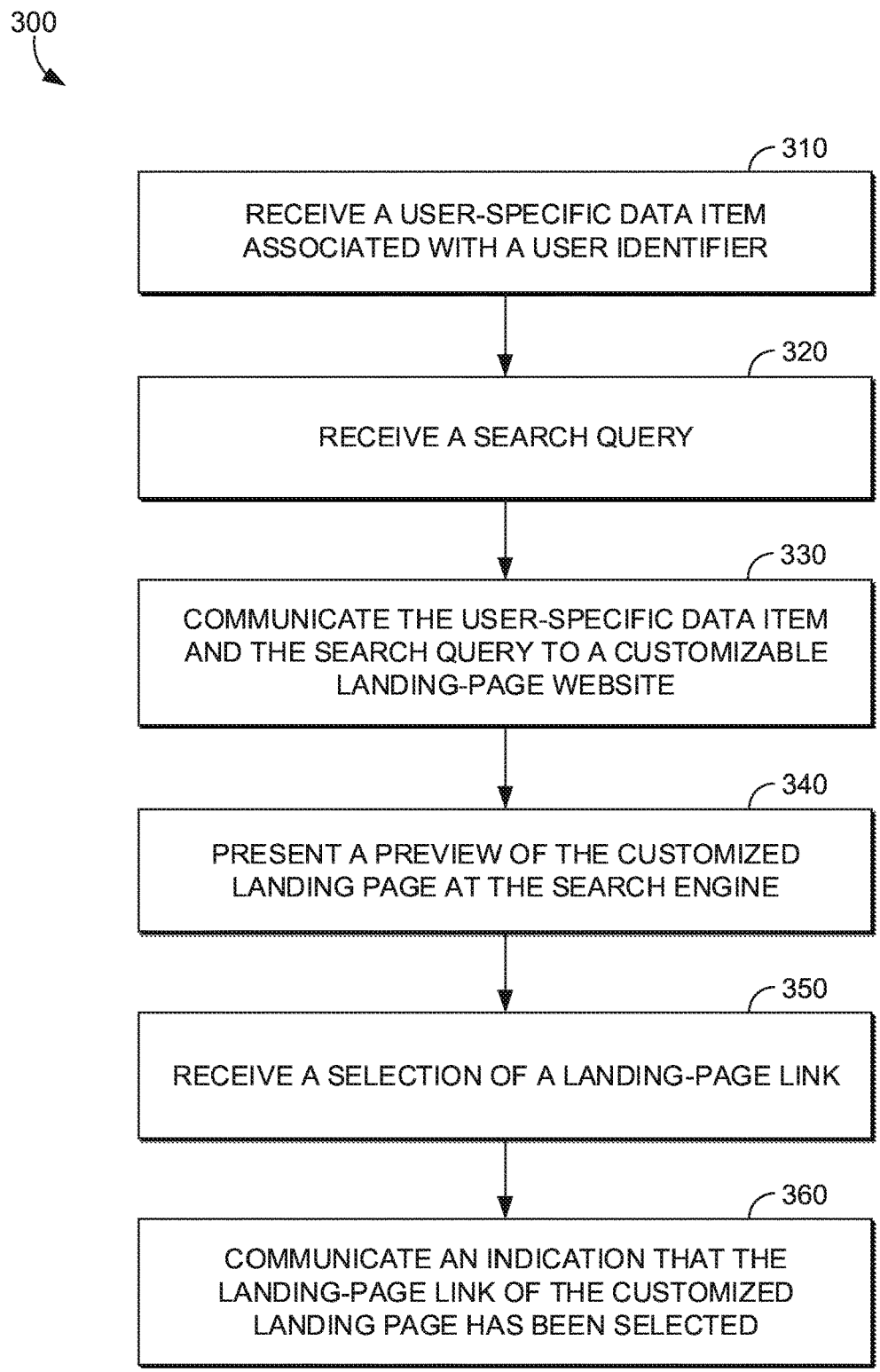
FIGS. 3-5 are block diagrams illustrating example methods for presenting a preview of a customized landing page at a search engine, in accordance with aspects described herein.
Figure 4:
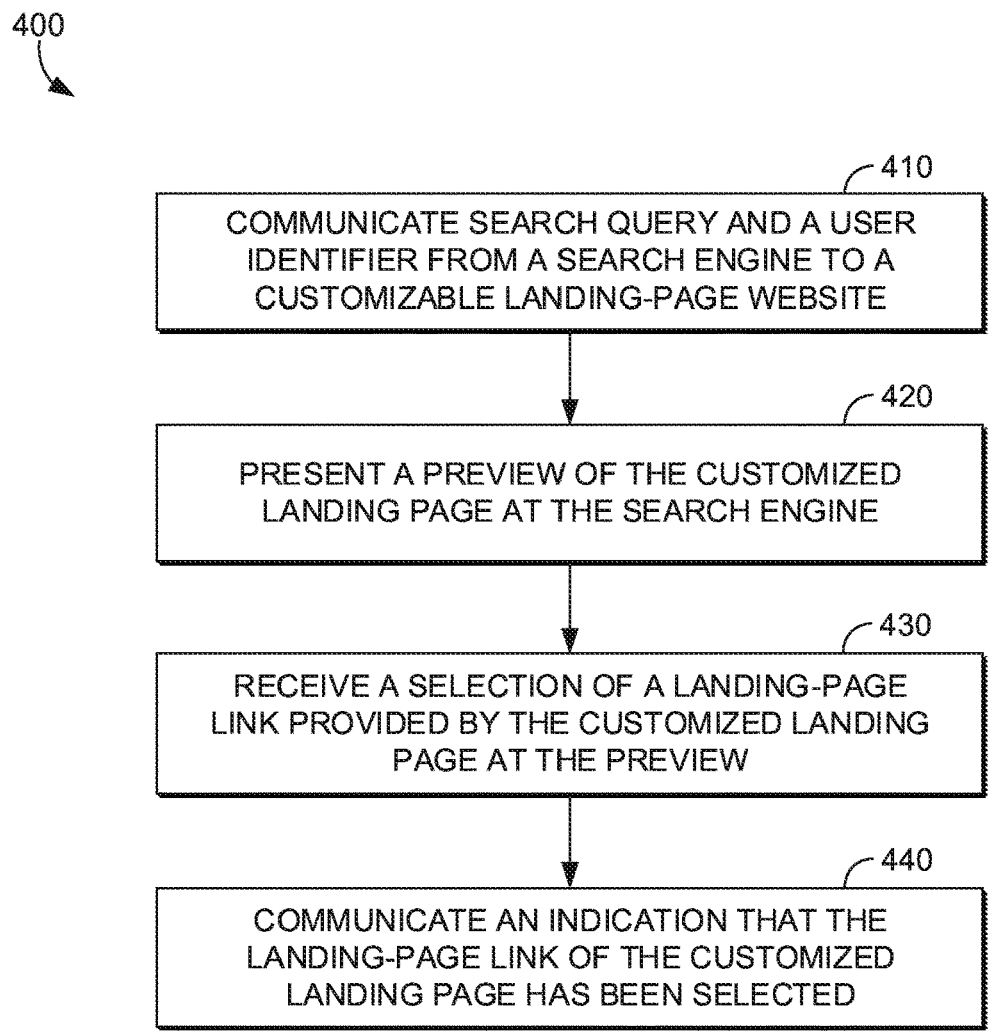
Figure 5:
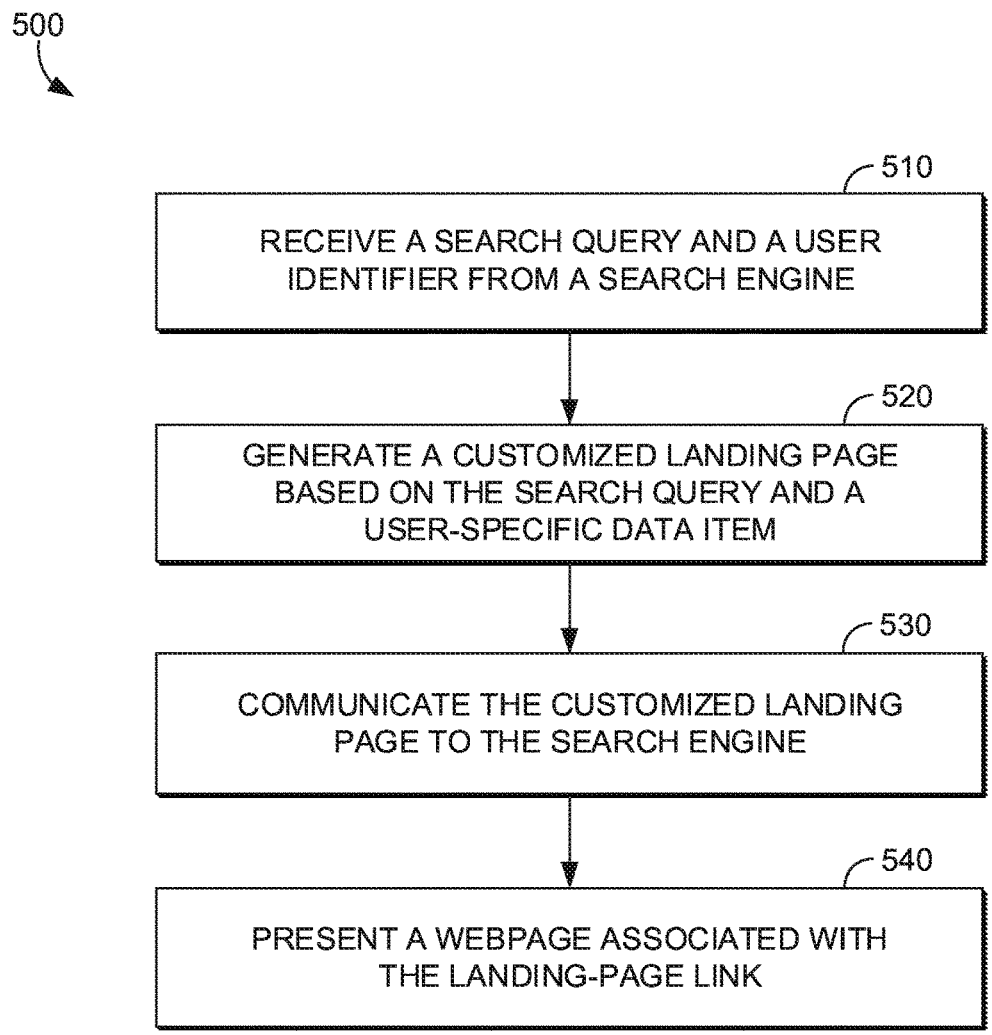

With reference to FIGS. 3, 4, and 5, block diagrams are provided to illustrate methods for providing a preview of a landing page at a search engine. The methods may be performed using the search system described herein. In embodiments, one or more computer storage media having computer-executable instructions embodied thereon that, when executed, by one or more processors, cause the one or more processors to perform the methods in the search system.

FIG. 3 provides a block diagram of example method 300 for presenting a preview of a customized landing page at a search engine. At block 310, a user-specific data item associated with a user identifier is received. The user-specific data item may be received at the search engine. At block 320, a search query is received. The search query may be received at the search engine. At block 330, the user-specific data item and the search query are communicated to a customizable landing-page website. The customizable landing-page website may generate a customized landing page. The customized landing page may comprise a user-specific element. The user-specific element may be associated with a landing-page link. The customized landing page may be generated in response to the communication.

At block 340, a preview of the customized landing page is presented at the search engine. In cases, the preview may be presented in a preview pane of the search engine. At block 350, a selection of a landing-page link provided by the customized landing page of the customizable landing-page website is received at the preview. The selection may be received within the preview pane of the search engine. At block 360, an indication that the landing-page link of the customized landing page has been selected is communicated. In cases, the indication may be communicated to a web browser of a computing device. In some cases, the indication may be communicated to the customizable landing-page website. Based on the selection, a user associated with the user identifier may be navigated from the search engine to a webpage of the customizable landing-page website or another webpage associated with the selection outside that of the customizable-landing-page website.

Turning to FIG. 4, FIG. 4 provides a block diagram of example method 400 for presenting a preview of a customized landing page at a search engine. At block 410, a search query and a user identifier are communicated from a search engine to a customizable landing-page website. The customizable landing-page website may generate a customized landing page. At block 420, a preview of the customized landing page is presented at the search engine. At block 430, a selection of a landing-page link provided by the customized landing page is received at the preview. In an example, the selection of the landing-page link is selected within a preview pane comprising the preview at the search engine, and the preview pane comprises one or more goods or services associated with the customized landing-page website, which is an e-commerce marketplace website, and a user is a candidate buyer of the goods or services executing the search query at the search engine, which comprises an Internet web crawler for identifying websites having information related to search queries. At block 440, an indication that the landing-page link of the customized landing page has been selected is communicated. The user associated with the user identifier may be navigated from the search engine to a webpage associated with the selected landing-page link based on the indication.

With reference to FIG. 5, FIG. 5 provides a block diagram of example method 500 for presenting a preview of a customized landing page at a search engine. At block 510, a search query and a user identifier are received from a search engine. At block 520, a customized landing page is generated based on the search query and a user-specific data item associated with the user identifier. The customized landing page may comprise a landing-page link. At block 530, the customized landing page is communicated to the search engine. Based on the communication, a preview of the customized landing page may be presented at the search engine. At block 540, a webpage associated with the landing-page link is presented. The webpage may be presented based on receiving an indication that the landing-page link has been selected at the preview presented at the search engine.

Turing briefly again to FIG. 1, having identified various component of search system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are intended as examples in nature and in number and are not to be construed as limiting for all implementations of the present disclosure. The functionality of search system 100 can be further described based on the functionality and features of the previously-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory.

Figure 6:
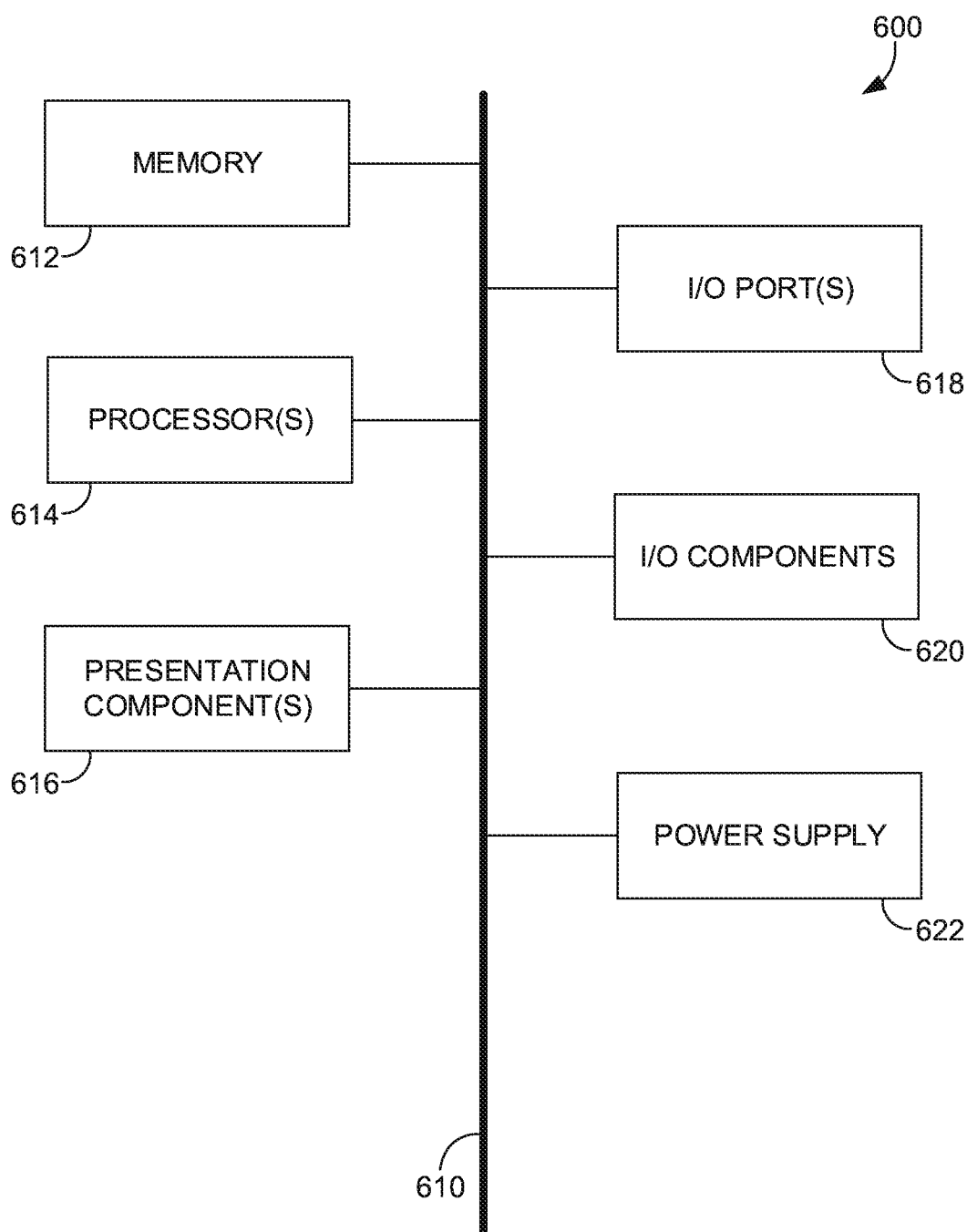
FIG. 6 is a block diagram of an example computing environment suitable for use in implementing aspects described herein.

Having described an overview of embodiments of the present technology, an example operating environment in which embodiments of the present technology may be implemented is described below in order to provide a general context for various aspects of the present technology. Referring initially to FIG. 6, in particular, an example operating environment for implementing embodiments of the present technology is shown and designated generally as computing device 600. Computing device 600 is but one example of a suitable computing environment and is not intended to suggest any limitation as to the scope of use or functionality of the technology. Neither should computing device 600 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrates an example computing device that can be used in connection with one or more embodiments of the present technology. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile or nonvolatile memory. The memory may be removable, non-removable, or a combination thereof. Example hardware devices include solid-state memory, hard drives, optical-disc drives, etc. Computing device 600 includes one or more processors that read data from various entities such as memory 612 or I/O components 620. Presentation component(s) 616 present data indications to a user or other device. Examples of presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology described with reference to a distributed computing environment; however the distributed computing environment depicted herein is merely an example. Components can be configured for performing novel aspects of embodiments, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages which are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. One or more computer storage media having computer-executable instructions embodied thereon that, when executed by one or more processors, cause the one or more processors to perform a method at a search engine for presenting a customized landing page at the search engine, the method comprising:
   receiving a search query at a search engine;
   communicating a user identifier identifying a user associated with the received search query to a customizable landing-page website identified by the search engine as related to the search query, wherein a customized landing page is generated by the customizable landing-page website based on a user-specific data item identified by the customizable landing-page website using the user identifier received from the search engine; and
   presenting a preview of the customized landing page at the search engine, wherein the customized landing page is received by the search engine from the customizable landing-page website.

2. The media of claim 1, wherein the search engine comprises an Internet web crawler for identifying websites having information related to search queries, and the customizable landing-page website is an e-commerce marketplace website indexing goods or services provided by a seller, and wherein the user is a candidate buyer of the goods or services.

3. The media of claim 1, wherein the preview of the customized landing page is presented in a preview pane of the search engine.

4. The media of claim 1, wherein the preview of the customized landing page comprises a first portion of the customized landing page, and in response to a user input, the preview of the customized landing page comprises a second portion of the customized landing page, the second portion different than the first portion.

5. The media of claim 1, further comprising:
   receiving, at the preview, a selection of a landing-page link provided by the customized landing page of the customizable landing-page website; and
   communicating an indication that the landing-page link of the customized landing page has been selected, wherein a user associated with the user identifier is navigated from the search engine to a webpage associated with the landing-page link based on the selection, and wherein the selection of the landing-page link is received within the preview pane.

6. The media of claim 1, wherein a user-specific element associated with the landing-page link of the customized landing page comprises a subcategory of the search query, the subcategory determined based on the user-specific data item.

7. A search system for presenting a customized landing page at a search engine, the system comprising:
   one or more processors; and
   one or more computer storage media storing computer-useable instructions that, when used by the one or more processors, cause the one or more processors to:
      communicate a user identifier identifying a user associated with a search query from a search engine to a customizable landing-page website identified by the search engine as related to the search query, wherein the customizable landing-page website generates a customized landing page based on a user-specific data item identified by the customizable landing-page website using the user identifier received from the search engine; and
      present a preview of the customized landing page at the search engine, wherein the customized landing page is received by the search engine from the customizable landing-page website.

8. The system of claim 7, wherein the customizable landing-page website is an e-commerce marketplace website indexing goods or services provided by a seller, and wherein the user is a candidate buyer of the goods or services.

9. The system of claim 7, wherein the customized landing page comprises a user-specific element associated with the landing-page link.

10. The system of claim 7, further comprising:
    receiving, at the preview, a selection of a landing-page link provided by the customized landing page; and
    communicating an indication that the landing-page link of the customized landing page has been selected, wherein a user associated with the user identifier is navigated from the search engine to a webpage associated with the selected landing-page link based on the selection, and wherein the preview of the customized landing page is presented in a preview pane of the search engine.

11. The system of claim 10, wherein the preview of the customized landing page comprises a first portion of the customized landing page, and in response to a user input, the preview of the customized landing page comprises a second portion of the customized landing page, the second portion different than the first portion.

12. The system of claim 11, wherein the selection of the landing-page link is received within the preview pane when the preview of the customized landing page comprises the second portion.

13. The system of claim 7, wherein a user-specific element associated with the landing-page link comprises a subcategory of the search query, the subcategory determined based on a user-specific data item associated with the user identifier.

14. The system of claim 13, wherein the user-specific data item comprises metadata determined from previous interactions with the search engine by the user or from previous interactions with the customizable landing-page website by the user.

15. A computer-implemented method for providing a customized landing page to a search engine, the method comprising:
   receiving a user identifier at a customizable landing-page website from a search engine, the customizable landing-page website having been identified by the search engine as related to a search query received at the search engine;
   identifying a user-specific data item using the user identifier received from the search engine;
   generating a customized landing page based on the user-specific data item associated with the user identifier; and
   communicating the customized landing page from the customizable landing-page website to the search engine, wherein based on the communication, a preview of the customized landing page is presented in a preview pane at the search engine.

16. The method of claim 15, wherein a user-specific element associated with the landing-page link comprises a subcategory of the search query, the subcategory determined based on the user-specific data item associated with the user identifier.

17. The method of claim 15, wherein the customized landing page comprises a landing-page link, and the method further comprises presenting a webpage associated with the landing-page link based on receiving an indication that the landing-page link has been selected at the preview presented by the search engine.

18. The method of claim 15, wherein a landing-page link of the customized landing page is selected within the preview pane comprising the preview at the search engine, wherein the preview pane comprises one or more goods or services associated with the customized landing-page website that is an e-commerce marketplace website, and wherein the user is a candidate buyer of the goods or services executing the search query at the search engine that comprises an Internet web crawler for identifying websites having information related to search queries.

19. The method of claim 15, wherein the user-specific data item comprises metadata determined from previous interactions with the search engine by a user or from previous interactions with the customizable landing-page website associated with the customized landing page by the user.

20. The method of claim 19, further comprising performing a clustering analysis on the metadata to identify the user-specific data item.

* * * * *